March 14, 1961

C. E. HOLADAY 2,975,361

APPARATUS FOR DETERMINING THE MOISTURE CONTENT OF
GRANULAR AND FIBROUS MATERIALS

Filed March 5, 1958

INVENTOR
C.E. HOLADAY

BY R. Hoffman

ATTORNEY

March 14, 1961 C. E. HOLADAY 2,975,361
APPARATUS FOR DETERMINING THE MOISTURE CONTENT OF
GRANULAR AND FIBROUS MATERIALS
Filed March 5, 1958 3 Sheets-Sheet 2

INVENTOR
C. E. HOLADAY

BY *R. Hoffman*
ATTORNEY

INVENTOR
C. E. HOLADAY

United States Patent Office 2,975,361
Patented Mar. 14, 1961

2,975,361

APPARATUS FOR DETERMINING THE MOISTURE CONTENT OF GRANULAR AND FIBROUS MATERIALS

Charles E. Holaday, 2879 S. Buchanan St., Arlington 6, Va.; dedicated to the Public Filed Mar. 5, 1958, Ser. No. 719,460

1 Claim. (Cl. 324—65)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

The patent rights for the United States in any invention in the patent to be granted on this application are dedicated to the public.

This invention relates to an improvement in apparatus for testing the moisture content of granular and fibrous materials, and particularly for determining the moisture content of granular substances, such as, cottonseed and fibrous substances, such as, raw lint cotton.

If resistance measurements are made between two fixed points within such a granular or fibrous material after it has been compressed to a uniform density, the resistance in ohms will have substantially an inverse logarithmic relationship with the moisture content of the specimen under test. The resistance of the specimen may be determined with a series type ohmmeter calibrated to measure the specific resistances of a particular substance over a selected moisture range. By measuring the resistances of various specimens of a particular substance with known moisture contents it is possible, therefore, to establish a curve which will indicate the moisture content of any specimen of a particular substance for a given electrical resistance reading at a particular temperature.

It is known that, when a granular material composed of irregularly shaped granules is compressed, the density of the material is more uniform in a direction parallel to that of the applied pressure than in the direction perpendicular to the applied pressure. This is so because the granules are not free flowing and cannot move freely in a perpendicular direction. As a result, the density in the perpendicular direction of the specimen is not uniform. Electrical resistance measurements taken through this portion will therefore be subject to considerable variability and error.

This invention, therefore, has for one of its objects the provision of convenient apparatus for determining the percentage of moisture in both granular and fibrous materials by measuring the variation in resistances of test specimens with various moisture contents in which the specimens are uniformly packed for optimum arrangement of paths of electrical conductivity between the measuring electrodes.

A further object of the invention is to provide a device for moisture determination in granular and fibrous materials which will require less than four minutes operation for completion of a test and which will be simple and economical to use. A device embodying these advantages would be useful at cotton gins, oil mills, and other field installations and would provide a valuable alternate procedure to the conventional laboratory methods which require elaborate equipment, trained personnel, and two to eighteen hours for completion.

Other objects will become apparent from the following description and the accompanying drawings in which.

Figure 2:
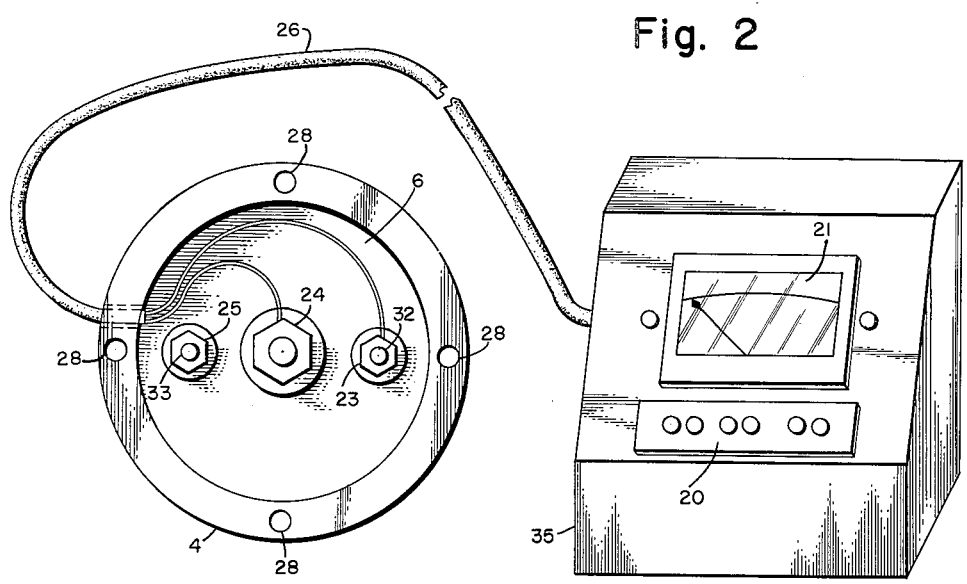
Figure 2 is a top plan view of the electrode showing the electrical connections to the ohmmeter.
Figure 1:
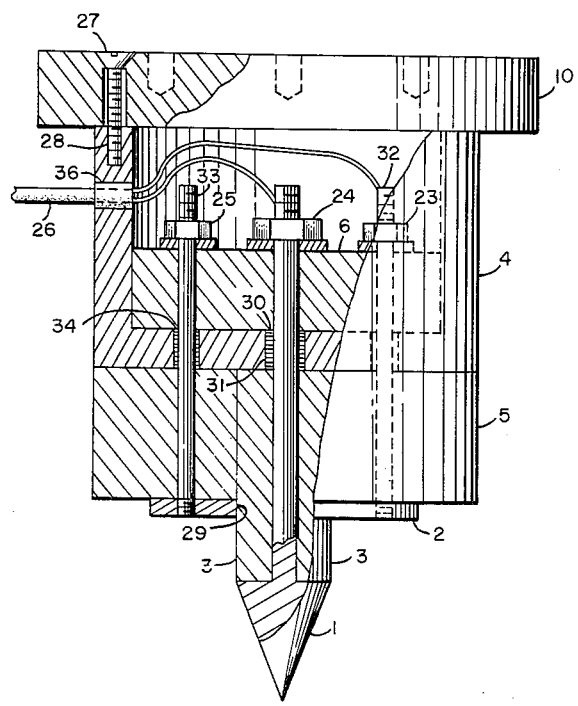
Figure 1 is a vertical view, partly in section, through a preferred form of the electrode of this invention.

In general, the invention comprises means for holding a specimen to be tested, a pair of contacts (described more fully below) mounted on an electrode adapted to be inserted into the specimen, means for applying pressure to the specimen so that it may be compressed to a uniform density, and an electrical measuring circuit connected to the two contacts for measuring the resistance of that portion of the test specimen which is included between the contacts.

In accordance with a preferred form the electrode of this invention comprises an elongated contact 1 provided with a cone-shaped tip at its lower end. This contact is surrounded by a non-conducting acrylic resin tube 3 which keeps contact 1 electrically insulated from an annular contact 2 which fits around the resin tube. Tube 3 fits through a central circular hole 29 in contact 2. The two contacts are mounted on a cup-shaped metallic base 4 and are electrically insulated therefrom by acrylic resin discs 5 and 6. Contact 1 is threaded at its upper end and is secured by means of nut 24. A non-conducting bushing 30 further insulates contact 1 from base 4 where it passes through hole 31 in the bottom of the base. Circular contact 2 is secured to the base by means of two threaded bolts 32 and 33 and nuts 23 and 25, respectively. Further insulation between contact 2 and base 4 is provided by plastic bushings 34. Electrical connection between the two contacts and the ohmmeter 35 is made by means of shielded cable 26 connected to the central conical tipped contact 1 and one of the bolts 32, for example. The cable is brought out through hole 36 in the side of the base.

Figure 3:
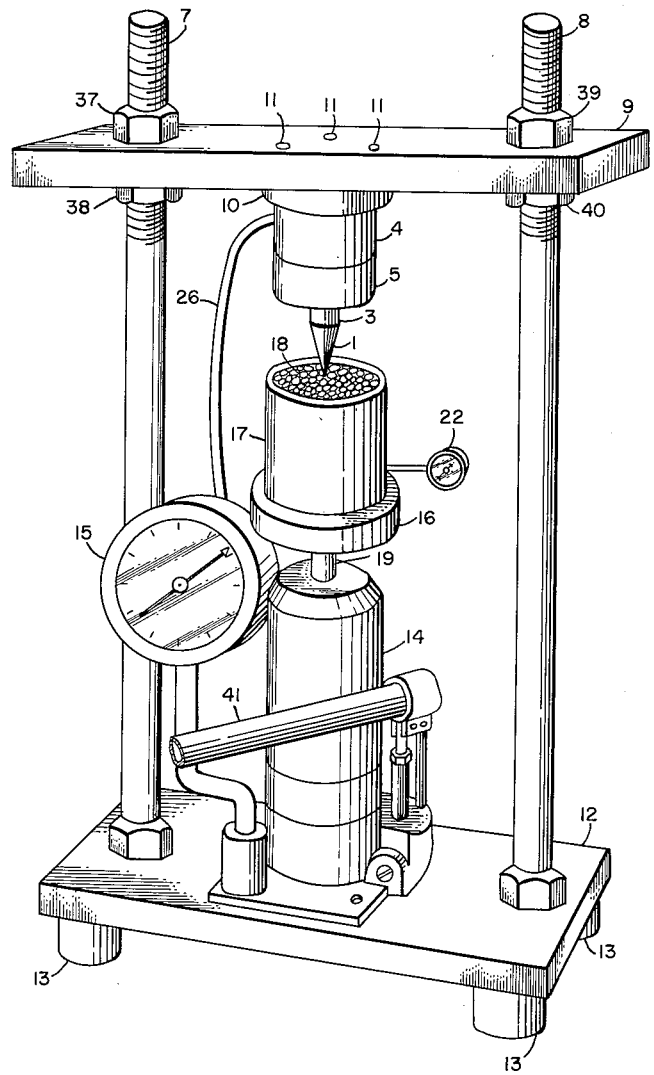
Figure 3 is a front view of the ohmmeter and pressure assembly with specimen in position for testing.
Figure 4:
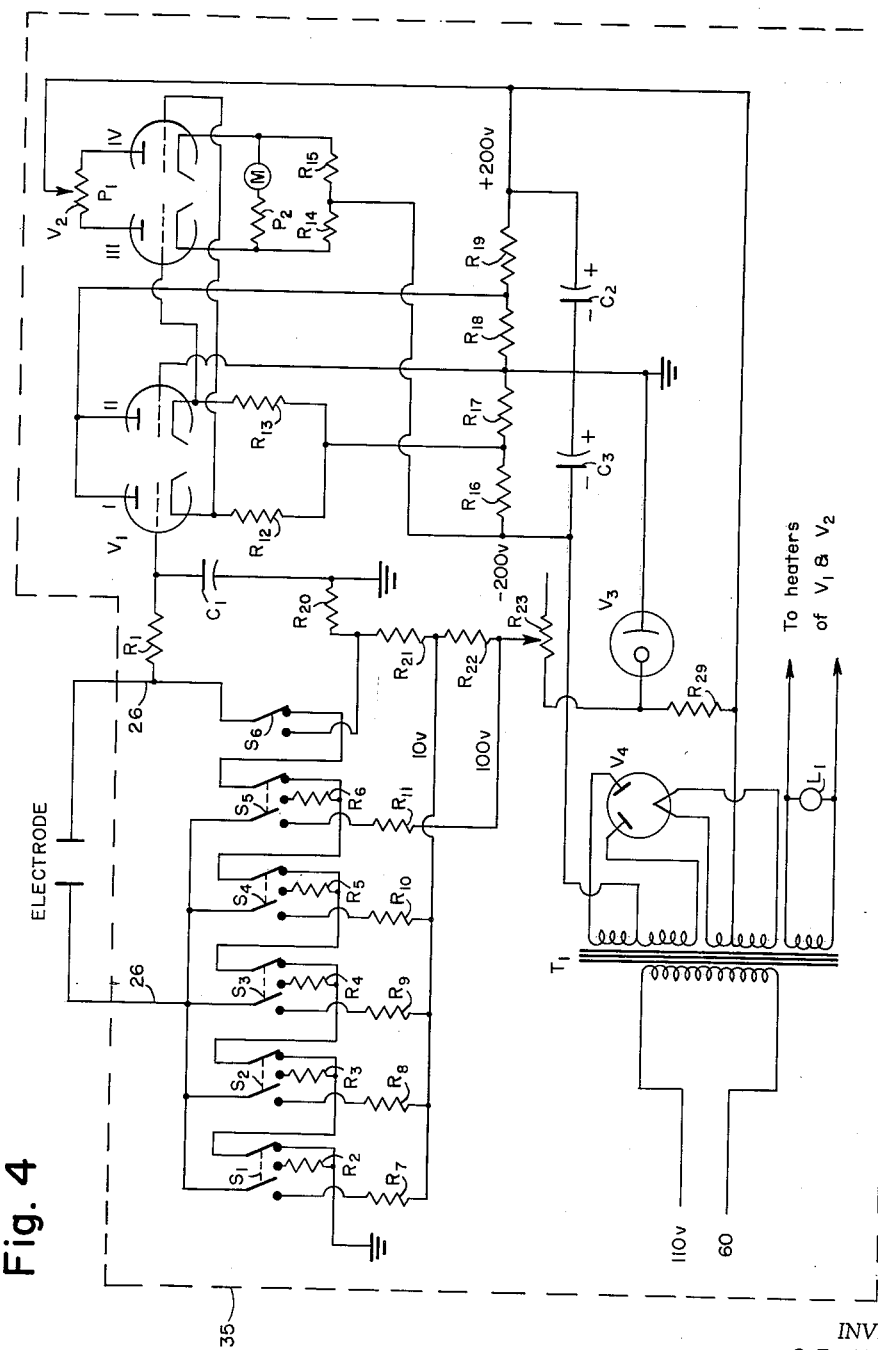
Figure 4 is an electrical circuit diagram for the ohmmeter used with the electrode.

The pressure device (Figure 3) has two one-inch metal uprights 7 and 8 which are threaded on the upper ends and which serve as a support for top platen 9. Platen 9 is held in place by means of nuts 37, 38, 39, and 40. The electrode is attached by means of screws 27 to a metallic disc 10, which in turn is attached to the underside of platen 9 by means of screws 11. This provides for easy removal and alignment of the electrode. The bottom platen 12, or base, of the pressure device is provided with legs 13 to facilitate handling. An hydraulic jack 14 is mounted on bottom platen 12 to provide the necessary pressure on the specimen being tested. The jack is provided with gauge 15 so that uniform pressure may be maintained during the testing operation and to enable the operator to reproduce the same conditions from one specimen to the next. A recessed metal plate 16 having a recess in its surface (not shown) for holding and positioning a specimen cup 17 is secured to the piston rod 19 of the jack. The specimen cup is made of any suitable material which is neither heat—nor electrically—conductive and has an inside diameter which is no more than about 1/16 inch greater than the outside diameter of base 4 and disc 5.

In operation, the material to be tested 18 is packed firmly into specimen cup 17 which is then placed on the cup holder. Using the hydraulic jack, a uniform pressure is applied to the specimen by means of handle 41 for a period of one to two minutes depending upon the type of material under test. Beginning with the low resistance or high moisture circuit of the ohmmeter 35 individual circuits are in turn connected to the electrode by means of a switching arrangement 20 until a reading of the meter 21 is obtained. Since the resistance of the specimen mass is affected by temperature, a dial thermometer 22, inserted through the wall of the cup near the lower edge, is employed for measuring the temperature of the specimen under test. A correction is applied to the moisture percentage when the temperature is above or below the prescribed temperature.

In a preferred form the cone-shaped point of contact 1 is about ¾ of an inch at its base and is machined to an angle of from 30° to 60°. It has been found that, within this range, much lower pressures on the specimen may be used to obtain a uniform density in the mass than if the contact were of any other shape or size. The contacts 1 and 2 may be made of any corrosion resistant metal, such as, stainless steel, bronze, or aluminum brass to avoid errors introduced by E.M.F.'s produced by contact between the moist test specimen and the metallic contacts.

The apparatus measures the conductivity of the granular or fibrous material in terms of electrical resistance which is then related to actual moisture percentages. The resistance measured is of that portion of the compressed specimen which bridges the gap between the vertical conical electrode and the horizontal circular electrode. That portion is uniformly compacted and provides a well-defined electrical contact so that accurate readings are obtained which are practically independent of the orginal closeness of packing of the sample and in which the effect of surface irregularities of the material is minimized.

Any suitable measuring circuit may be used. Many vacuum tube ohmmeters which include a source of direct current voltage for applying across the test specimen electrodes are commercially available, and the invention is not restricted to any particular model. It is only necessary that the instrument be sensitive over the expected range of resistances to be measured, and the selection of a suitable instrument can be made by anyone skilled in the art.

It will also be apparent to those skilled in the art that changes as to form and arrangement of parts may be made without departing from the spirit of the invention.

I claim:

In an apparatus for determining the moisture content of granular or fibrous material by measuring the electrical resistance of a sample while the latter is maintained under compression, the improvements which comprise a cylindrical receptacle of electrically non-conducting material for holding the sample to be tested and coacting therewith, a substantially cylindrical electrode assembly in axial alignment with said receptacle, said electrode assembly comprising a cylindrical metallic base, a cylindrical block of electrically non-conductive material having a diameter corresponding to the diameter of the metallic base mounted coaxially on said base, an elongated cylindrical electrically conductive contact having a conical shaped tip at one end thereof and extending through the block and rigidly secured to the base in axial alignment therewith for insertion into a sample contained in the receptacle, tubular insulating means having an outside diameter corresponding to the base diameter of the conical shaped tip surrounding said cylindrical contact and abutting both the conical base of said cylindrical contact and the metallic base, a discal electrically conductive contact having an outside diameter less than the diameter of the cylindrical block but substantially greater than the outside diameter of the tubular insulating means surrounding said tubular insulating means being rigidly secured to the cylindrical block and base on the side of the cylindrical block which is proximate to the conical tip of the elongated cylindrical contact, the conductive surfaces of the conical tip contact and the discal contact being disposed in planes substantially at right angle to each other, insulating means to insulate the contacts from the metallic base, means for connecting the contacts into an electrical resistance measuring circuit, and means for applying pressure between the receptacle and the electrode assembly to force the conductive contacts of the electrode assembly into engagement with a sample contained in said receptacle and to uniformly compress and pack said sample within the receptacle circumjacent the conductive surfaces of the conical tip, the discal contact, and the walls of the receptacle.

References Cited in the file of this patent
UNITED STATES PATENTS

| | | |
|---|---|---|
| 2,063,840 | Fairchild et al. | Dec. 8, 1936 |
| 2,082,364 | Store | June 1, 1937 |
| 2,437,134 | Smith | Mar. 2, 1948 |
| 2,587,771 | Schoenbaum et al. | Mar. 4, 1952 |

FOREIGN PATENTS

| | | |
|---|---|---|
| 990,812 | France | Sept. 26, 1951 |
| 1,138,846 | France | June 20, 1957 |